Patented Aug. 11, 1931

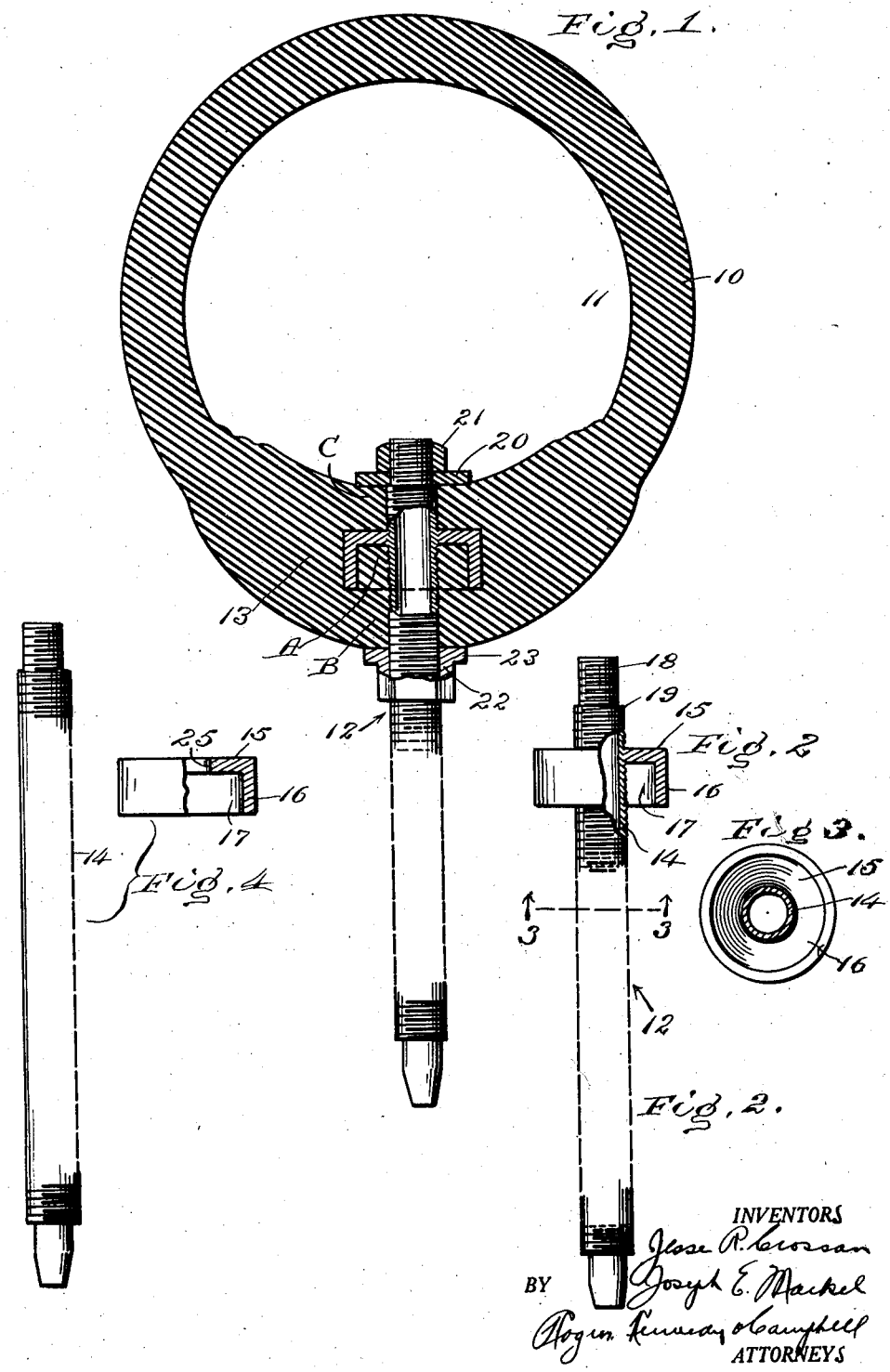

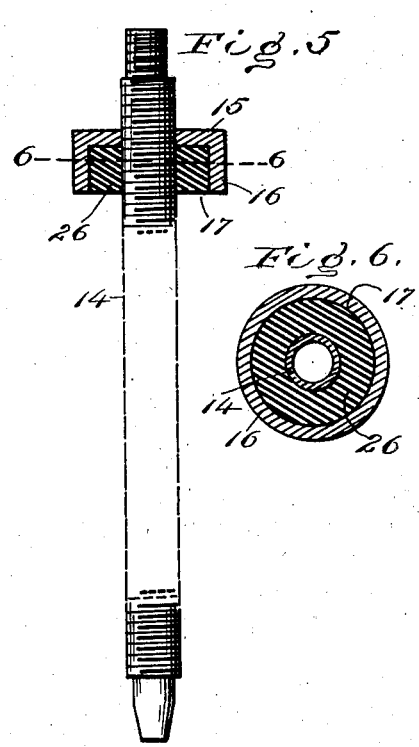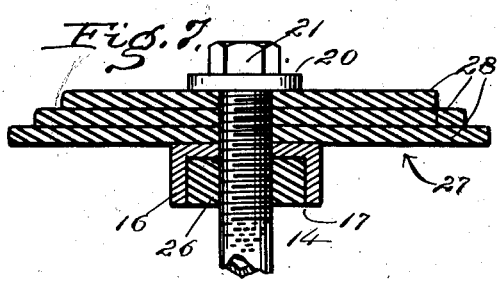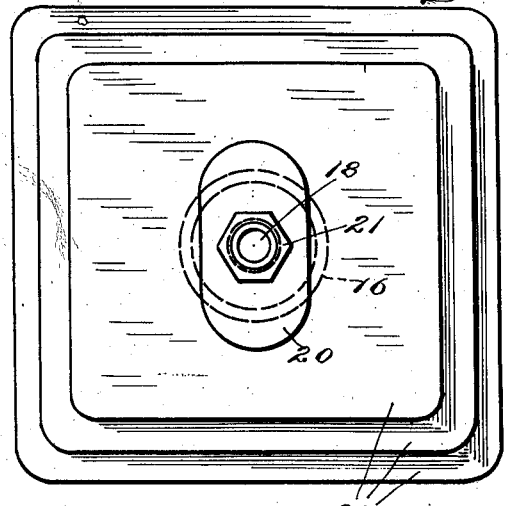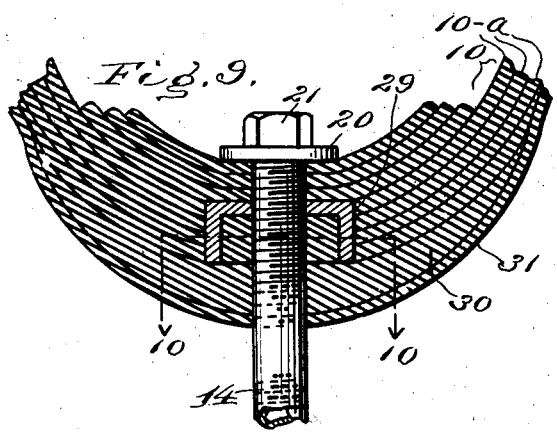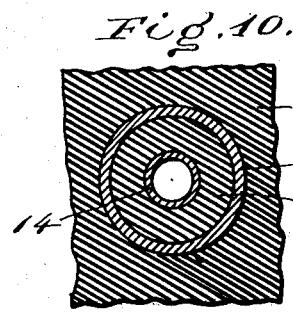

1,818,536

UNITED STATES PATENT OFFICE

JESSE R. CROSSAN, OF WADSWORTH, AND JOSEPH E. MACKEL, OF JOHNSONS CORNERS, OHIO, ASSIGNORS TO SEIBERLING RUBBER COMPANY, A CORPORATION OF DELAWARE

VALVED INFLATABLE RUBBER FORMER

Application filed January 31, 1928, Serial No. 250,761. Renewed June 20, 1931.

This invention relates to inflatable rubber articles and refers particularly to air bags and water bags for use in vulcanizing pneumatic tires, and to methods for producing the same.

In vulcanizing pneumatic tires, inflatable formers are used to give proper internal shape to the tires, such formers being hollow and provided with inflation valve stems to facilitate the introduction of air, water, or other suitable fluid under pressure. The valve stems are secured to the inner or base walls of the formers, extending thru said walls and provided with clamping means for engaging the opposite surfaces thereof, but considerable difficulty has been experienced in effecting a fluid-tight anchorage of the stems in the rubber. In inserting the bag within a tire and in positioning the tire and bag in the vulcanizing mold as well as in subsequently removing the bag from the finished tire, the valve stem of the bag is used as a handle, imposing strains which tear the rubber away from the stem, and as a result leakage of the inflating fluid past the side of the valve stem soon occurs. Usually, this leakage happens well before the bag proper becomes unserviceable, and so it is evident that failure of the valve anchorage constitutes a serious defect in air or water bags as heretofore constructed.

The principal object of the present invention is to provide an improved air bag, water bag, or the like, which will have a longer life than prior art bags by virtue of a novel valve construction and anchorage.

More specifically, the invention contemplates a rubber air bag or former provided with a tubular valve stem having a cup-shaped anchor entirely embedded within a wall of the rubber body. Portions of the rubber completely fill the cup-shaped anchor, and clamping flanges or washers associated with the stem at opposite sides of the anchor assist in maintaining the valve stem in proper position. The rubber within the anchor is in effect confined between relatively fixed walls and will not be torn away from the valve stem when the latter is subjected to transverse strains, because the rubber is bodily movable with said relatively fixed walls.

The invention also contemplates a novel method for producing the improved inflatable former. This, the cun-shaped anchor is first filled with suitable unvulcanized rubber, after which the valve assembly is positioned within the air bag with the anchor completely filling and extending thru an opening in the wall of said bag. Reenforcing pads, preferably of laminated rubber, are applied to the opposite sides of the anchor, being of such area as to overlie the portions of the bag wall adjacent the anchor, and after said pads have been clamped in position the entire device is vulcanized, whereby the several rubber portions become united and merged into a homogeneous whole.

The foregoing and other objects, features, and advantages of the invention will be readily apparent from the following description in connection with the accompanying drawings, wherein a preferred form of the invention has been shown by way of illustration, and wherein:

Fig. 1 is a transverse sectional view thru the improved air bag, showing parts of the valve stem in elevation and parts in section;

Fig. 2 is a detail side elevation of the valve stem or valve body per se;

Fig. 3 is a transverse sectional view on line 3—3 of Fig. 2;

Fig. 4 is a view showing the tubular valve body and the cup-shaped anchor in their separate conditions prior to assembly;

Fig. 5 is a view similar to Fig. 2, but illustrative of the first step in the method of assembling the valve with the rubber, and more especially showing the cup-shaped anchor filled with gum stock;

Fig. 6 is a transverse sectional view on line 6—6 of Fig. 5;

Fig. 7 is a fragmentary sectional view of the inner end of the valve stem with one of the reenforcing pads in place;

Fig. 8 is a plan view of the reenforcing pad and valve shown in Fig. 7;

Fig. 9 is a fragmentary sectional view thru the air bag wall with the valve in place and the outer reenforcing pad in position ready for vulcanization; and Fig. 10 is a transverse sectional view on line 10—10 of Fig. 9.

The invention has been illustrated in the drawings as applied to an air bag 10, which may be formed of rubber or other customary material, and which is usually in the form of an annular tube, the interior of which constitutes a fluid chamber 11 into which air, steam, water, or the like, may be introduced thru the valve 12. The bag 10 is of such a cross sectional configuration as to conform to the desired size and shape of the interior of a tire with which it is mounted during the vulcanizing of said tire, and preferably the inner wall or base of the bag is increased in thickness as indicated at 13 in order to more firmly anchor the valve 12 in place.

As best shown in Figs. 2 and 3, the valve 12 comprises a tubular stem 14 formed of brass or other suitable metal and provided on its exterior with screw threads. Secured to said stem 14, adjacent its inner end or base, is a cup-shaped anchor having an annular portion 15 which extends laterally from the sides of the stem, and a peripheral flange portion 16 which encircles the same and preferably extends outwardly with reference to the fluid chamber 11. Said flange 16 and annular portion 15 define a groove or recess 17 of substantial proportions and within which part of the rubber of the finished bag is confined, as will hereinafter be explained. The inner extremity of the stem 14 is preferably reduced in diameter and provided with screw threads as indicated at 18, and provides a shoulder 19 against which a detachable flange or washer 20 is adapted to be seated in spaced relation to the annular portion 15 of the anchor, said washer 20 being securely held in place by means of a clamping nut 21 which engages the screw threads 18. Another nut 22 having an integral flange portion 23 (or separate washer) is threaded upon the exterior of the stem 14 between the cup-shaped anchor and the outer end of the stem, and the arrangement is such that said nut 22 can be turned to effect a clamping pressure upon the rubber in opposition to the anchor.

As has previously been stated, the recess 17 within the cup-shaped anchor is adapted to be entirely filled with rubber as indicated at A in Fig. 1, and the pressure of the flanged nut 22 confines the rubber within said recess. The rubber lying between the anchor and the nut, and indicated at B, is likewise firmly clamped between the two. In a similar manner, the rubber lying between the anchor and the washer 20, and indicated at C, will be clamped firmly between these parts when the nut on the inner end of the valve stem is tightened up. Having been vulcanized together, the rubber portions A, B, and C, will of course form a homogeneous mass, so that any forces tending to displace the valve 12 with reference to the rubber body will be firmly resisted because of the anchorage of the valve stem within the rubber. Preferably, the cup-shaped anchor is of a diameter greater than the width of the flange members 20 and 23, and as a result it constitutes what might be described as a fulcrum point for any rocking movement of the valve. Since the rubber at A is positively confined between the relatively fixed walls 15 and 16 of the cup-shaped anchor and the adjacent portion of the valve stem 14, movement of the valve will result in corresponding movement of the rubber at A, and thus it will not be possible to separate the rubber at this point from its union with the interior of the anchor and the exterior of the valve stem. If a leak should start at the base of the valve it would have to travel around the outside of the anchor and then along the inside thereof to the stem, necessarily traveling a much greater distance than with the ordinary stems, and so leakage of the inflating fluid from the chamber 11 past the side of the valve stem will be practically impossible. By virtue of this fact the life of the entire bag will be much longer than that of prior art bags.

Initially the valve stem 14 may be made from a piece of plain tubing or the like as indicated in Fig. 4, and the cup-shaped anchor with its annular portion 15 and peripheral flange 16 may be separately formed with a substantially central opening 25 into which the stem 14 may be inserted. The anchor can thus be conveniently assembled with the stem 14 and permanently secured thereto as by brazing, welding, or otherwise, as shown in Fig. 2.

While various methods may be employed for producing the complete air bag with the improved valve anchorage, the method steps illustrated in Figs. 5 to 10 inclusive have been found expedient. From these views it will be seen that, after the valve 12 has been formed as previously described, the interior 17 of the cup-shaped anchor is filled with rubber as indicated at 26 in Fig. 5, said rubber being preferably unvulcanized. Thereafter a reenforcing pad 27, which may conveniently be formed of laminations 28 of sheet rubber, is applied to the inner end of the stem 14 and clamped in position between the annular portion 15 of the anchor and the base flange 20, (see Fig. 7). The air bag 10 is next built up in the usual manner from laminations 10ᵃ upon a suitable drum, and said laminations 10ᵃ are formed with apertures 29 thru which the anchor is adapted to extend. These apertures 29 may be pre-formed in the laminations 10ᵃ or the anchor pushed forcibly thru them one after another as they are built up. The valve 12, with the reenforcing pad 27, is preferably assembled with the air bag laminations 10ᵃ by inserting the valve stem 14 thru the apertures 29 from the inside, so that the pad 27 overlies the surrounding portions of the inner surface of the bag body. Another reenforcing pad 30 is then slipped over the outer end of the stem 14 and brought up against the outer surface of the bag body as clearly illustrated in Fig. 9, said pad 30 preferably being partially vulcanized. A thin sheet of rubber 31 is then applied to the outer side of the pad 30 and the nut 22 screwed onto the valve stem so as to effect the desired clamping pressure upon the rubber, after which the parts so assembled can be vulcanized in a mold or otherwise, all as well known to those skilled in the art. The rubber at 26, laminations 28 of the pad 27, the laminations 10ᵃ, and the pad 30 with its cover sheet 31, all become firmly united in a homogeneous unit during the vulcanizing operation, and as a result the cup-shaped anchor is completely embedded in and united with the rubber.

It will now be apparent that an improved inflatable former and novel method for producing the same have been provided constituting a substantial advance in the art. Leakage of air or other fluid past the side of the valve stem is prevented by the fact that the rubber at A within the cup-shaped anchor is positively confined between relatively fixed walls between which the rubber forms a seal by virtue of the clamping pressure upon it and because there is no possibility for relative movement between the rubber and the metal, and even tho some fluid should get by the base member 20 it would not be able to work its way past the seal formed within the cup. While the invention has been disclosed as specifically embodied in an air bag, it is not restricted to such use since the salient features may be incorporated in other types of inflatable articles.

Furthermore it is to be understood that the invention is susceptible of modifications in the details of construction and arrangement of parts, and the right is herein reserved to make such changes as fall within the scope of the appended claims without departing from the spirit of the invention.

Having thus described our invention, what we claim and desire to secure by Letters Patent of the United States is as follows:

1. An inflatable rubber article, comprising a hollow body of pliable rubber, a valve stem extending thru the wall of said body, and a cup-shaped anchor secured to said valve stem and embedded in the rubber wall.

2. An inflatable rubber article, comprising a hollow body of pliable rubber, a valve stem extending thru the wall of said body, and a cup-shaped anchor secured to said valve stem and embedded in a substantially central position in the rubber wall.

3. An inflatable rubber article, comprising a hollow body of pliable rubber, a valve stem extending thru the wall of said body, an anchor secured to said valve stem and embedded in the rubber wall, and means for clamping adjacent portions of the rubber against the opposite sides of the anchor.

4. An inflatable rubber article, comprising a hollow body of pliable rubber, a valve stem extending through the wall of said body, an anchor secured to said valve stem and embedded in the rubber wall, and adjustable means on the valve stem for engaging the opposite surfaces of the rubber wall to exert clamping pressure thereon against the anchor in opposite directions.

5. An inflatable rubber article, comprising a hollow body of pliable rubber, a valve stem extending thru the wall of said body, a cup-shaped anchor secured to said valve stem and embedded in the rubber wall, and means for clamping adjacent portions of the rubber against said anchor.

6. An inflatable rubber article, comprising a hollow body of pliable rubber, a valve stem extending thru the wall of said body, a cup-shaped anchor secured to said valve stem and embedded in the rubber wall, portions of the rubber filling said cup-shaped anchor, and means for effecting clamping pressure on the rubber toward the open end of the cup-shaped anchor.

7. An inflatable rubber article, comprising a hollow body of pliable rubber, a valve stem extending thru the wall of said body, a cup-shaped anchor encircling the valve stem and secured thereto, said cup-shaped anchor having its peripheral flange portion extending outwardly and being embedded in the rubber wall and filled with portions thereof, and clamping means adjustably mounted on the valve stem at the outer side of the rubber wall, said clamping means being adapted to effect pressure on the rubber in opposition to the open end of the anchor.

8. An inflatable rubber article, comprising a hollow body of pliable rubber, a valve stem extending thru the wall of said body, a cup-shaped anchor secured to said valve stem and embedded in the rubber wall in a substantially central position, and clamping members mounted on the valve stem and respectively bearing against the inner and outer sides of the rubber wall to hold the rubber against the cup-shaped anchor.

9. An inflatable former comprising an endless tubular body member formed of rubber, a valve stem extending thru a wall portion of the rubber to afford communication from the exterior to the interior of the body member, an anchor rigidly secured to the valve stem adjacent to the inner end thereof and embedded in a substantially central position in the rubber wall, said anchor being characterized by a groove or recess of substantial proportions encircling the valve stem and filled with portions of the rubber wall, and screw-threaded clamping elements mounted on the valve stem at the inner and outer sides of the rubber wall whereby to press the rubber against said embedded anchor.

10. In or for an inflatable rubber article, a valve stem provided with screw threads on its exterior, a cup-shaped anchor secured to the stem adjacent to one end thereof and forming an annular recess which encircles part of the stem, and screw-threaded clamping elements engaging the exterior of the stem and spaced from the opposite ends of the cup-shaped anchor.

11. In or for an inflatable rubber article, a valve body comprising a tubular stem provided with a reduced inner extremity, said stem and inner extremity being screw-threaded, a metallic cup-shaped anchor secured to the stem in concentric relation at a position outwardly from the reduced inner extremity, said cup-shaped anchor having its peripheral flange directed outwardly away from said inner extremity, and forming an annular recess of substantial proportions around part of the stem, an adjustable clamping element on the threaded inner extremity of the stem in fixed relation to the cup washer, and an additional clamping element adjustably mounted on the stem outwardly from the cup washer.

12. As a new article of manufacture, a valve stem having a cup-shaped anchor integral therewith.

13. As a new article of manufacture, a valve stem having a cup-shaped anchor integral therewith, and clamping nuts adjustable on the stem at opposite sides of the anchor.

In testimony whereof, we have affixed our signatures hereto.

JESSE R. CROSSAN.
JOSEPH E. MACKEL.